W. Van Dusen.
Crank Paddle.
No. 314.
Patented Jul. 29, 1837.

UNITED STATES PATENT OFFICE.

WASHINGTON VAN DUSEN, OF KENSINGTON, PENNSYLVANIA.

IMPROVEMENT IN THE MANNER OF CONSTRUCTING AND WORKING PADDLES TO BE USED AS ICE-BREAKERS AND PROPELLERS IN ICE-BOATS, STEAMBOATS, AND OTHER PURPOSES.

Specification forming part of Letters Patent No. 314, dated July 29, 1837.

*To all whom it may concern:*

Be it known that I, WASHINGTON VAN DUSEN, shipwright, of Kensington, in the county of Philadelphia and State of Pennsylvania, have invented an Improvement in the Manner of Constructing and Working Paddles to be Used as Ice-Breakers and Propellers in Ice-Boats, and which are applicable also to the propelling of boats generally as a substitute for the ordinary paddle-wheel, and likewise a substitute for water-wheels in driving machinery; and I do hereby declare that the following is a full and exact description thereof.

The paddles which I use are operated upon by a crank-motion, and are so constructed as to dip into and leave the water at right angles, or nearly so, to its surface.

Figure 1:
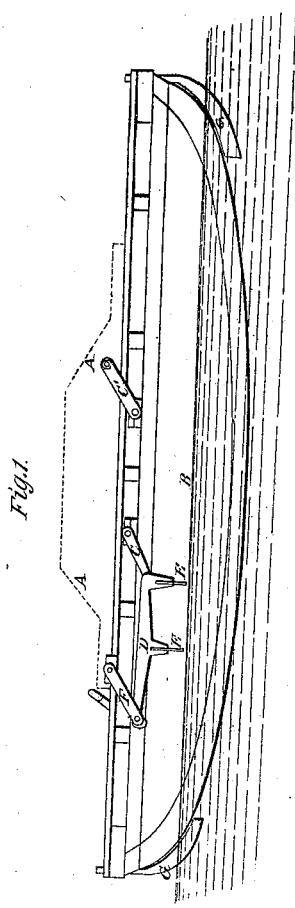

Figure 1 in the accompanying drawings represents the side of an ice-boat, showing one of the modes in which I suspend and operate the frame to which the ice-breakers or paddles are attached.

The dotted line A represents the place of the guards, and the line B the water-line of the boat.

C C are cranks, the shafts of which rest upon proper bearings crossing the boat, and are moved by steam or other power in any of the usual modes. Two such cranks are represented, as there may be two or more sets of paddle-frames and paddles, if desired.

D is the paddle-frame carrying the paddles or ice-breakers E E. These, when used for breaking ice, are made of iron or steel, and the frame also, to which they are attached, will be best made of iron, although they may be of any other material possessing sufficient strength.

F is one side or arm of a swinging frame, to which the paddle-frame is attached at the end opposite to the crank, the swinging frame vibrating backward and forward as the crank revolves.

The paddles or ice-breakers, as shown in the drawings, are in the position in which they stand when just about to break the ice or enter the water. The arm of the crank and the side or arm of the swing-frame are parallel to each other, or nearly so, causing the paddles to stand in a vertical position, which they will retain until by the action of the crank they are lifted above the water-line.

G G are rudders at each end of the boat, the form of which is such as will cause them to pass through ice with but little obstruction.

Figure 2:
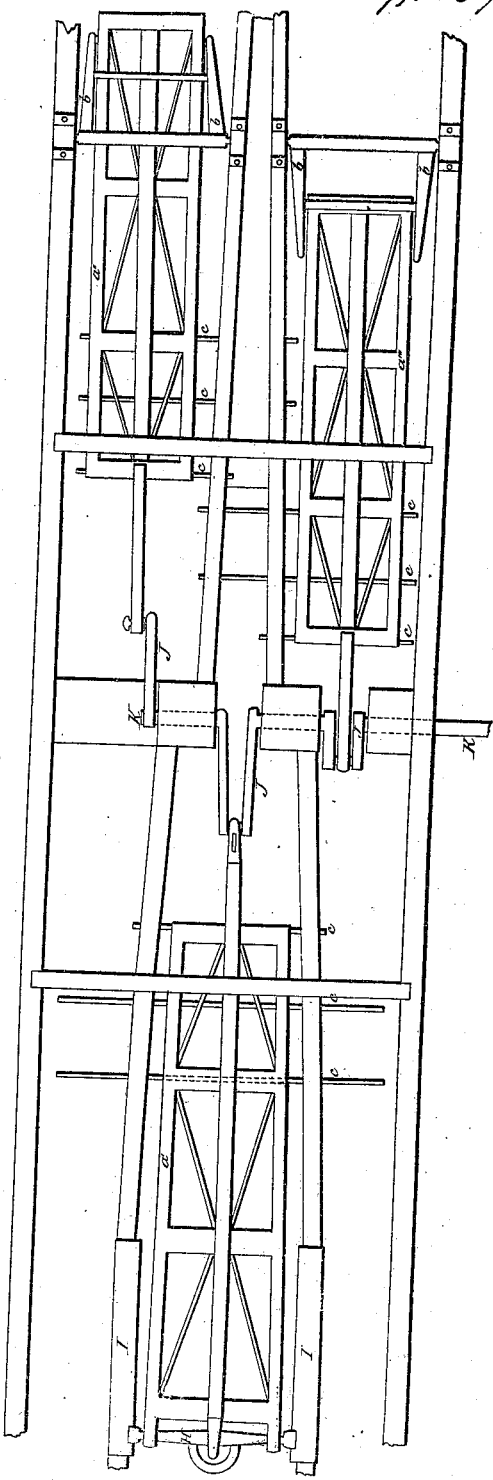

Instead of using the swinging frame F to vibrate with the action of the crank, the paddle-frame may be lengthened out at the end opposite to the crank, so that it may slide back and forth between guides or slides placed upon the guards. Fig. 2 represents the upper sides of such a paddle-frame, H being a sliding shaft at its extreme end, which slides between the cheeks, guides, or slides I I. When so constructed, the whole lift of the paddles depends upon the crank J, which renders the lengthening of the paddle-frames necessary. The crank-shaft K crosses the boat in the manner of the ordinary wheel-shaft. There may be a double or a treble crank on each end of the shaft, and the like number of paddle-frames with their swinging frames or slides, and upon each paddle-frame there may be two or three paddles, or such other number as may be found best. In this manner of constructing the paddle-frames and their appendages the paddles will be made to enter and to leave the water in a position nearly vertical, while by making the crank of a proper length—say about five feet—it will at the time of entering the water have a rapid horizontal motion.

For ice-boats, and probably in all cases, the employment of the swinging frame to sustain one end of the paddle-frame will be preferred, as otherwise the frame must be of much greater length, and might not act so well when ice is to be cut or broken. For simple propelling, however, there will be no sensible difference in their operation, provided sufficient length can be given to the sliding end of the paddle-frame. In an ice-boat the employment of a fly-wheel properly geared to the crank-shaft, will be necessary. In simple propelling this will not be the case.

I am aware that paddles have been attached to frames and worked by double cranks, the arms of which cranks were so geared together as to rise and fall simultaneously. I am also aware that paddles have been worked by a crank-motion arranged in other ways, as, for example, in that for which a patent was granted in England to I. L. Stevens in the year 1828; but, as I verily believe that the modes devised by me and herein described are essentially new and constitute an improvement upon those above alluded to, I ask Letters Patent of the United States therefor, and claim as my invention and improvement—

1. The method of operating the paddles or ice-breakers by means of a crank at one end of a crank-frame, having at the other end a vibrating frame, as herein set forth.

2. The employment of such a paddle-frame lengthened out and sliding back and forth horizontally between guides, substantially upon the principle or in the manner herein fully made known, whether used for breaking ice and propelling at the same time or for propelling simply, and as paddles so constructed and arranged may in certain situations be substituted for water-wheels in operating machinery in mills, I further claim the application of my improvement thereto.

W. VAN DUSEN.

Witnesses:
   THOS. P. JONES,
   CLEMENT T. COOKE.